United States Patent Office 2,820,049
Patented Jan. 14, 1958

2,820,049
PREPARATION OF UNSYMMETRICAL TRIALKYL TETRATHIO-ORTHO-PHOSPHATES

Carleton B. Scott, Pomona, Calif., assignor to Union Oil Company of California, Los Angeles, Calif., a corporation of California No Drawing. Application February 13, 1956
Serial No. 564,887

11 Claims. (Cl. 260—461)

This invention relates to the preparation of alkyl esters of tetrathio-ortho-phosphoric acid, and in particular concerns an improved method for preparing trialkyl-tetrathio-ortho-phosphates in which at least two of the alkyl groups are different and at least one of the alkyl groups is methyl or ethyl. Such compounds may be represented generically by the structural formula:

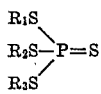

wherein $R_1$ represents a methyl or ethyl group, $R_2$ represents an alkyl group different from that represented by $R_1$, and $R_3$ represents an alkyl group.

In U. S. Patent No. 2,063,629, Salzberg and Werntz describe the preparation of symmetrical higher trialkyl tetra-ortho-thiophosphates by reacting three mols of a higher alkyl mercaptan with phosphorus pentasulfide, and teach that mixed or unsymmetrical analoges of such compounds can be obtained by reacting one or two moles of a higher alkyl mercaptan with phosphorus pentasulfide and thereafter reacting the resulting product with one or more moles of a different higher alkyl mercaptan. However in preparing the unsymmetrical compounds by such method, I have found that the yield of the desired compounds is quite low by reason of a variety of side reactions occurring and a variety of undesired by-products being formed. In attempts to avoid a considerable part of these difficulties by carefully purifying the intermediate product before reacting it with the second higher alkyl mercaptan, I have further found that such intermediate product is so unstable and decomposes so readily that it cannot be purified.

The present invention is based on the discovery that while the mixed higher trialkyltetrathio-ortho-phosphates can not be prepared in satisfactory yield either by the method of Salzberg and Werntz or by modifying such method so as to include an intermediate purification step, the same is not true when the initial reaction is carried out with methyl or ethyl mercaptan. More particularly, I have found that, in contrast to the higher alkyl mercaptans, methyl or ethyl mercaptan can be reacted with phosphorus pentasulfide to form methyl trithio-metaphosphate in good yield and in readily purified form in accordance with the equation:

(1)
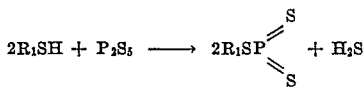

wherein $R_1$ represents a methyl or ethyl group, and that the purified trithiometaphosphate reacts readily with other alkyl mercaptans to form mixed trialkyl tetrathio-ortho-phosphates in excellent yield. The latter reaction may be carried out in a single step in accordance with the equation:

(2)
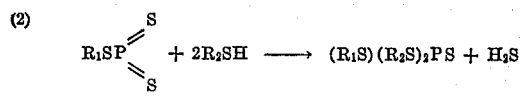

wherein $R_1$ represents a methyl or ethyl group and $R_2$ represents an alkyl group different from that represented by $R_1$, or it may be effected in two steps as follows:

(3)
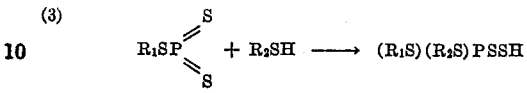

(4)
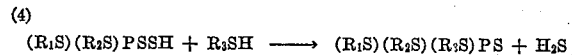

wherein $R_1$ and $R_2$ have the meaning stated above and $R_3$ represents an alkyl group. In effecting Reactions 3 and 4, the intermediate dialkyl tetrathio-ortho-phosphoric acid product need not be isolated and purified.

The process of the invention thus consists essentially in reacting substantially pure methyl or ethyl trithiometaphosphate with at least one alkyl mercaptan in which the alkyl group is different from that of the trithiometaphosphate under conditions hereinafter specified to form a mixed trialkyl tetrathio-ortho-phosphate.

The methyl or ethyl trithiometaphosphate reactant may be obtained either by reacting methyl or ethyl mercaptan with phosphorus pentasulfide in accordance with Equation 1, above, or by reacting phosphorus pentasulfide with trimethyl- or triethyl-tetrathio-ortho-phosphate in accordance with the equation:

(5)
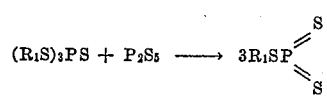

wherein $R_1$ represents a methyl or ethyl group. When proceeding according to the first of such methods, the reaction is carried out simply by heating a mixture comprising phosphorus pentasulfide and the desired mercaptan at a temperature between about 90° C. and about 200° C. for 2–40 hours under sufficient pressure to maintain the reactants in the liquid phase. The mercaptan and phosphorus pentasulfide may be employed in equimolecular proportions, although an excess of the phosphorus pentasulfide is usually preferred. Conveniently, the reaction is carried out in the presence of an inert reaction medium such as benzene, toluene, or the like. As the reaction proceeds, it is advantageous gradually to reduce the pressure. Upon completion of the reaction, the product is isolated from the reaction mixture and purified by conventional means, e. g., by fractional distillation or crystallization. Purification by fractional crystallization is preferred. As an example of the manner in which such procedure has been carried out, a mixture comprising 1000 parts by weight of phosphorus pentasulfide, 432 parts by weight of methyl mercaptan, and 800 parts by weight of benzene was placed in a pressure vessel which was then pressured up to about 100 p. s. i. g. with dry nitrogen. The vessel and contents were heated at about 95° C. for 4 hours, over which time the vessel was slowly vented to a final pressure of about 30 p. s. i. g. The reaction mixture was filtered hot to remove unreacted phosphorus pentasulfide. Upon cooling, the filtrate deposited large yellow crystals of methyl trithiometaphosphate. After a single recrystallization from benzene, the product was substantially pure, having a melting point of about 112° C.

In preparing the trithiometaphosphate reactant from the corresponding tetrathio-ortho-phosphate in accordance with Equation 5, above, the reactants are preferably employed in substantially equimolecular proportions, although an excess of either may be employed if desired. The reaction takes place smoothly merely upon heating a mixture of the two reactants at 90°–200° C. for 2–20 hours, preferably in the presence of an inert reaction medium such as benzene or xylene. Since both reactants are relatively high-boiling the reaction may be carried out at atmospheric pressure, although either sub- or superatmospheric pressures may be employed if desired. Conveniently, the reaction is effected at reflux temperature and atmospheric pressure. Upon completion of the reaction, the trithiometaphosphate product is separated from the reaction mixture in the usual manner, e. g., by fractional crystallization. To exemplify this mode of procedure, a mixture consisting of 61.5 parts by weight of triethyl-tetrathio-ortho-phosphate, 55.5 parts by weight of phosphorus pentasulfide and 86 parts by weight of xylene was heated at reflux temperature for 20 hours, after which the reaction mixture was filtered and cooled. Ethyl trithiometaphosphate crystallized from the cooled filtrate in the form of yellow needles which, after recrystallization from benzene, had a melting point of about 57° C.

In preparing mixed trialkyl-tetrathio-ortho-phosphates by reaction in accordance with Equation 2 above, a mixture of substantially pure methyl or ethyl trithiometaphosphate ($R_1SPS_2$) and the desired alkyl mercaptan ($R_2SH$) is heated for from about 0.5 to about 5 hours at a reaction temperature between about 20° C. and about 200° C. and under sufficient pressure to maintain the reactants in the liquid phase. At least about two, and preferably from two to four, moles of the mercaptan are provided per mole of the trithiometaphosphate. An inert reaction medium such as benzene, toluene, diethyl ether, etc. may be employed if desired. Upon completion of the reaction, the reaction mixture is cooled and the mixed trialkyltetrathio-ortho-phosphate is recovered in substantially pure form by fractional distillation under vacuum. In many instances a product of satisfactory commercial purity may be obtained by employing an excess of the mercaptan to insure complete consumption of the trithiometaphosphate reactant and upon completion of the reaction removing the unreacted mercaptan by simple distillation or gas stripping.

The following example is illustrative of the foregoing embodiment of the invention, but is not to be construed as limiting the same:

Example I

Approximately one mole of methyl trithiometaphosphate, and three moles of n-hexyl mercaptan are dissolved in an equal volume of xylene and heated for 4 hours at a temperature of about 125° C. under atmospheric pressure. The reaction mixture is then distilled under slightly reduced pressure to remove xylene and unreacted hexyl mercaptan, whereby there is obtained dihexyl methyl tetrathio-ortho-phosphate of commercial purity in a yield of about 75 percent of theoretical.

In preparing mixed trialkyl-tetrathio-ortho-phosphates by the two-step operation illustrated by Equations 3 and 4, above, the initial reaction is carried out under the same conditions as are described above for effecting the reaction of Equation 2, i. e., by heating the reactants for 0.5–5 hours at 20° C.–200° C. and under sufficient pressure to maintain the reactants in the liquid phase. However, in order to insure the formation of the maximum amount of the desired intermediate product, only one or less moles of the mercaptan are employed per mole of the trithiometaphosphate. The second reaction is carried out at temperatures between about 50° C. and about 200° C., and under sufficient pressure to maintain the reactants in the liquid phase. Again, an inert reaction medium, which may conveniently be the same as that employed in the initial reaction, may be employed to advantage. Completion of the reaction usually requires between about 0.5 and about 5 hours, depending upon the identity of the reactants and the particular reaction temperature employed. Upon completion of the reaction, the product is isolated and purified by fractional distillation or crystallization.

The following examples illustrate the preparation of several mixed trialkyl tetrathio-ortho-phosphates by the two-step method just described, but are not to be construed as limiting the invention.

Example II

A mixture consisting of 210 parts by weight of methyl trithiometaphosphate, 116 parts by weight of isopropyl mercaptan and 154 parts by weight of diethyl ether is heated at reflux temperature under atmospheric pressure for about 30 minutes to obtain an ether solution of methyl isopropyl tetrathio-ortho-phosphate

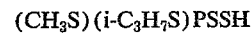

$$(CH_3S)(i\text{-}C_3H_7S)PSSH$$

Approximately one-half of this product is then admixed with 76 parts by weight of isopropyl mercaptan, and the resulting mixture is heated at reflux temperature for about 30 minutes. The reaction mixture is then distilled under atmospheric pressure to remove the ether, after which the pressure is reduced and the distillation is continued. Di-isopropyl methyl tetrathio-ortho-phosphate, $(i\text{-}C_3H_7S)_2(CH_3S)PS$, is obtained as a yellow oil distilling at 120°–135° C. under 0.4 mm. pressure. The yield is 67 percent of theoretical.

Example III

The unused half of the ether solution of methyl isopropyl tetrathio-ortho-phosphate prepared in Example II and 48 parts by weight of methyl mercaptan are charged into an autoclave and heated on a steam bath for 1 hour. The pressure within the autoclave quickly rises to about 63 p. s. i. g., and then slowly decreases to atmospheric pressure as hydrogen sulfide is removed through a bleed valve. The reaction product is then fractionally distilled to obtain dimethyl isopropyl tetrathio-ortho-phosphate, $(CH_3S)_2(i\text{-}C_3H_7)PS$, distilling at 131°–142° C. under 1.1–1.5 mm. pressure. The yield is 66 percent of theoretical.

In order to demonstrate the advantage of the present process over that of the prior art, the following experiment was carried out: Twelve moles of methyl mercaptan and 3 moles of phosphorus pentasulfide were mixed with 500 ml. of benzene and charged to a pressure vessel. The mixture was heated at 120°–130° C. under a pressure of 150–110 p. s. i. g. for three hours, after which the vessel was cooled and vented. Six moles of isopropyl mercaptan were then added to the reaction mixture, and heating was continued at about 100° C. for 2.5 hours. The product was then cooled and fractionally distilled under vacuum. The amount of dimethyl isopropyl tetrathio-phosphate obtained was only about 400 grams, corresponding to a yield of only about 29 percent of theoretical.

The following example illustrates the preparation of a completely unsymmetrical trialkyl tetrathio-ortho-phosphate by the process of the invention.

Example IV

An equimolecular mixture of ethyl trithiometaphosphate and isopropyl mercaptan is admixed with three times its volume of benzene and is heated at reflux temperature for 3 hours. The reaction product, which essentially comprises ethyl isopropyl tetrathio-ortho-phosphate, is then directly admixed with an equimolecular amount of sec.-butyl mercaptan, and the mixture is heated at reflux temperature for 2.5 hours. The ethyl isopropyl sec.-butyl tetrathio-ortho-product is recovered from the reaction product in substantially pure form by fractional distillation under vacuum.

Other modes of applying the principle of my invention may be employed instead of those explained, change being made as regards the methods or materials employed provided the step or steps stated by any of the following claims, or the equivalent of such stated step or steps, be employed.

I, therefore, particularly point out and distinctly claim as my invention:

1. The process for preparing an unsymmetrical trialkyl tetrathio-ortho-phosphate having the formula:

wherein $R_1$ represents an alkyl group selected from the class consisting of methyl and ethyl, and $R_2$ represents a lower alkyl group different from that represented by $R_1$, which comprises heating a mixture comprising an alkyl trithiometaphosphate of the formula $R_1SPS_2$, wherein $R_1$ has the meaning stated above, and an alkyl mercaptan of the formula $R_2SH$, wherein $R_2$ has the meaning stated above, at a reaction temperature and under sufficient pressure to maintain the components of said mixture in the liquid state, from about 2 to about 4 molecular equivalents of said mercaptan being employed per molecular equivalent of said alkyl trithiometaphosphate.

2. The process of claim 1 wherein the reaction temperature is maintained between about 20° C. and about 200° C.

3. The process of claim 2 wherein said heating is carried out in the presence of an inert liquid reaction medium.

4. The process of claim 2 wherein the said alkyl trithiometaphosphate is methyl trithiometaphosphate.

5. The process of claim 2 wherein the said alkyl trithiometaphosphate is ethyl trithiometaphosphate.

6. The process for preparing an unsymmetrical trialkyl tetrathio-ortho-phosphate of the formula:

wherein $R_1$ represents an alkyl group selected from the class consisting of methyl and ethyl, and $R_2$ represents a lower alkyl group different from that represented by $R_1$, and $R_3$ represents a lower alkyl group, which comprises heating at a reaction temperature a mixture comprising an alkyl trithiometaphosphate of the formula $R_1SPS_2$, wherein $R_1$ has the meaning stated above, and an alkyl mercaptan of the formula $R_2SH$, wherein $R_2$ has the meaning stated above, until reaction is substantially complete, at least about one molecular equivalent of said alkyl trithiometaphosphate being employed per molecular equivalent of said mercaptan of the formula $R_2SH$, and thereafter heating the resulting reaction product with an alkyl mercaptan of the formula $R_3SH$, wherein $R_3$ has the meaning stated above, both of said heating steps being carried out under sufficient pressure to maintain the reactants in the liquid phase.

7. The process of claim 6 wherein the first of said heating steps is carried out at a reaction temperature between about 20° C. and about 200° C., and the second of said heating steps is carried out at a reaction temperature between about 50° C. and about 200° C., and both of said heating steps are effected in the presence of an inert liquid reaction medium.

8. The process of claim 6 wherein $R_3$ is different from both $R_1$ and $R_2$.

9. The process of claim 6 wherein $R_3$ represents the same alkyl radical as $R_2$.

10. The process of claim 6 wherein $R_3$ represents the same alkyl radical as $R_1$.

11. The process for preparing an unsymmetrical trialkyl tetrathio-ortho-phosphate having the formula

wherein $R_1$ represents an alkyl group selected from the class consisting of methyl and ethyl, and $R_2$ represents a lower alkyl group different from that represented by $R_1$, and $R_3$ represents a lower alkyl group, which comprises heating at least one molecular equivalent of an alkyl trithiometaphosphate of the formula $R_1SPS_2$, wherein $R_1$ has the meaning stated above, with one molecular equivalent of an alkyl mercaptan of the formula $R_2SH$, wherein $R_2$ has the meaning stated above, and with one molecular equivalent of an alkyl mercaptan of the formula $R_3SH$, wherein $R_3$ has the meaning stated above; $R_2SH$ and $R_3SH$ being employed in admixture when $R_2$ and $R_3$ represent the same alkyl group but being employed successively when $R_2$ and $R_3$ represent different alkyl groups, and said heating being carried out under sufficient pressure to maintain the reactants in the liquid phase.

References Cited in the file of this patent

UNITED STATES PATENTS 2,769,831    Scott    Nov. 6, 1956

OTHER REFERENCES

Kosolapoff: "Organo-Phosphorus Compounds," John Wiley & Sons, N. Y., page 232 (1950).